United States Patent
Barber et al.

(10) Patent No.: US 6,744,771 B1
(45) Date of Patent: Jun. 1, 2004

(54) METHOD AND SYSTEM FOR MASTER TO MASTER COMMUNICATION IN CONTROL SYSTEMS

(75) Inventors: Ronald W. Barber, Plano, TX (US); William B. McGrane, Dallas, TX (US); Charles W. Partridge, Wylie, TX (US); Mark R. Lee, Richardson, TX (US); Aaron L. Myer, Draper, UT (US)

(73) Assignee: AMX Corporation, Richardson, TX (US)

( * ) Notice: Subject to any disclaimer, the term of this patent is extended or adjusted under 35 U.S.C. 154(b) by 0 days.

(21) Appl. No.: 09/328,926

(22) Filed: Jun. 9, 1999

(51) Int. Cl.[7] .............................................. H04L 12/12
(52) U.S. Cl. ...................... 370/400; 709/208
(58) Field of Search ................................ 370/389, 390, 370/400, 401, 351, 352, 353, 354; 709/208, 209, 211, 223, 217

(56) References Cited

U.S. PATENT DOCUMENTS

| | | | | |
|---|---|---|---|---|
| 5,444,851 A | * | 8/1995 | Woest | 395/200.1 |
| 5,720,032 A | * | 2/1998 | Picazo, Jr. et al. | 395/200.2 |
| 5,740,231 A | * | 4/1998 | Cohn et al. | 379/89 |
| 5,910,954 A | * | 6/1999 | Bronstein et al. | 370/401 |
| 6,085,243 A | * | 7/2000 | Fletcher et al. | 709/224 |
| 6,101,189 A | * | 8/2000 | Tsuruoka | 370/401 |

FOREIGN PATENT DOCUMENTS

EP  0 812 086 A2  12/1997
WO  WO 98/00788  1/1998

OTHER PUBLICATIONS

C. Hedrick, "Routing Information Protocol," RFC 1058, Jun. 1988, pp. 1–29.
R. Droms, "Dynamic Host Configuration Protocol," RFC 1541, Oct. 1993, pp. 1–34.
Andrew Tanenbaum, "Computer Networks," Prentice Hall International (London), p. 345–403, (1996).
Joe Desbonnet, et al., "System Architecture and Implementation of a CEBus/Internet Gateway," IEEE Transactions on Consumer Electronics, IEEE, Inc. (New York, United States), vol. 43 (No. 4), p. 1057–1062, (Nov. 1997).
Peter M. Corcoran, et al., "Browser–Style Interfaces to a Home Automation Network", IEEE Transactions on Consumer Electronics, IEEE, Inc. (New York, United States), p. 1063–1069, (Nov. 1997).

* cited by examiner

*Primary Examiner*—Steven H. D Nguyen
*Assistant Examiner*—Duc Duong
(74) *Attorney, Agent, or Firm*—Gardere Wynne Sewell LLP

(57) ABSTRACT

A master controller (28) in a control area network system in a larger control area network (16, 18) may have a plurality of devices (33) coupled thereto. The devices generate data which the master controller directs to a destination device coupled to the same master controller, a different master controller in the same control area network or to a different master controller in a different control area network. The master controller directs the data using a connections table acquired from one or more other master controllers to which the master controller may communicate with.

28 Claims, 6 Drawing Sheets

METHOD AND SYSTEM FOR MASTER TO MASTER COMMUNICATION IN CONTROL SYSTEMS

RELATED APPLICATIONS

This patent application is related to U.S. applications entitled METHOD AND SYSTEM FOR OPERATING VIRTUAL DEVICES BY MASTER CONTROLLERS IN A CONTROL SYSTEM, Ser. No. 09/328,921, filed Jun. 9, 1999; and METHOD FOR DYNAMICALLY UPDATING MASTER CONTROLLERS IN A CONTROL SYSTEM, Ser. No. 09/328,885, filed Jun. 9, 1999.

TECHNICAL FIELD OF THE INVENTION

This invention relates generally to control systems and more particularly to a method and system for communicating data between master controllers in control area networks.

BACKGROUND OF THE INVENTION

Through the use of a control system, various equipment or appliances in an environment, such as a home or business, can be computer-controlled to form an automated environment. The controlled equipment may include heating, ventilation and air conditioning (HVAC) systems, lighting systems, audio-visual systems, telecommunications systems, security systems, surveillance systems, and fire protection systems, for example. The equipment may be coupled to equipment controlling devices that are linked to a computer-based master controller through the use of a control area network. One or more user interface devices, such as a touch panel, may also be linked to the control area network to accept user input and display current system status.

Traditional control systems typically have no or limited support for interconnecting multiple master controllers and supporting communications between multiple master controllers. The limited support traditionally available limited the ability of a user to distribute and partition control systems and associated devices across logical and geographic boundaries.

SUMMARY OF THE INVENTION

From the foregoing, it may be appreciated that a need has arisen for a method and apparatus for effecting master controller communication between control area networks and control area networks systems.

According to the present invention, a method and system are provided to address this need, and involves a communications network, a first master controller and a second master controller, the first and second master controllers are coupled to the communications network. The method and system further involve a plurality of devices, a first set of the devices are coupled to the first master controller and a second set of the devices are coupled to the second master controller via the communications network, and each device has at least one port. In addition, the method and system further involve a first device manager associated with the first master controller and a second device manager associated with the second master controller. The first device manager maintaining first device status data associated with the first set of the devices and the second device manager maintaining second device status data associated with the second set of the devices. Also, the method and system involve a first connection manager associated with the first master controller and a second connection manager associated with the second master controller. The first connection manager is operable to accept data from the first set of devices and route the data to the second master controller, and the second connection manager is operable to accept the data from the first master controller and send the data to the second set of the devices.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Control area networks may be used to replace the typical discrete systems used to control items in a home or business. Traditionally, items such as light fixtures and VCRs have been separately and manually controlled by light switches and individual remote controls. The present invention replaces such traditional systems with integrated, electronic control area networks to control items in a home or business.

Figure 1:
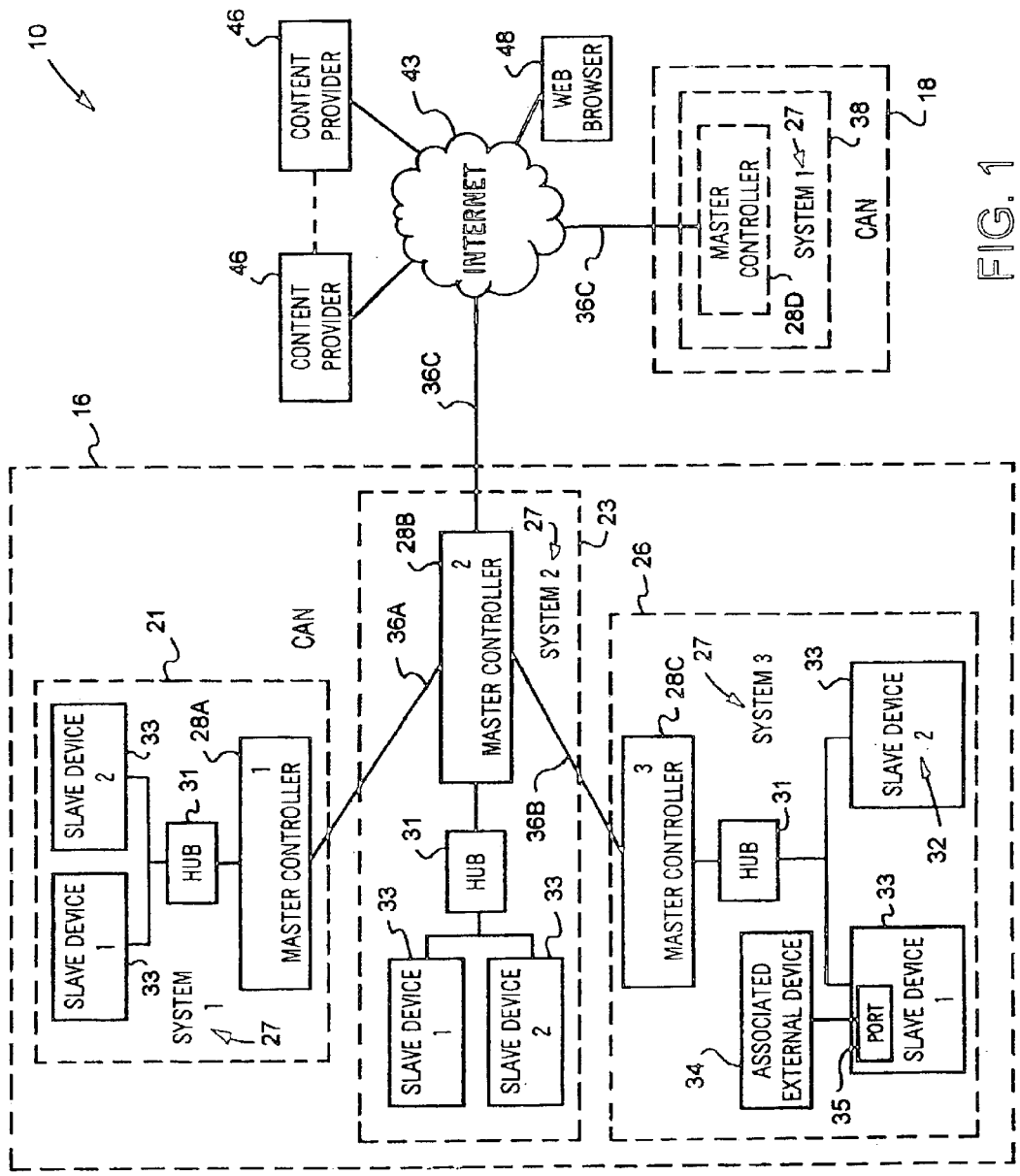
FIG. 1 is a block diagram of an exemplary configuration of control area networks utilizing the present invention.

FIG. 1 is a block diagram showing an exemplary configuration of control area networks utilizing the present invention. A distributed control area network configuration 10, in the disclosed embodiment, includes a first control area network 16 and a second control area network 18. In another embodiment of the present invention, first and second control area networks 16 and 18 form a single control area network. First control area network 16 includes a plurality of control area network systems 21, 23, and 26 ("CAN systems").

Figure 2:
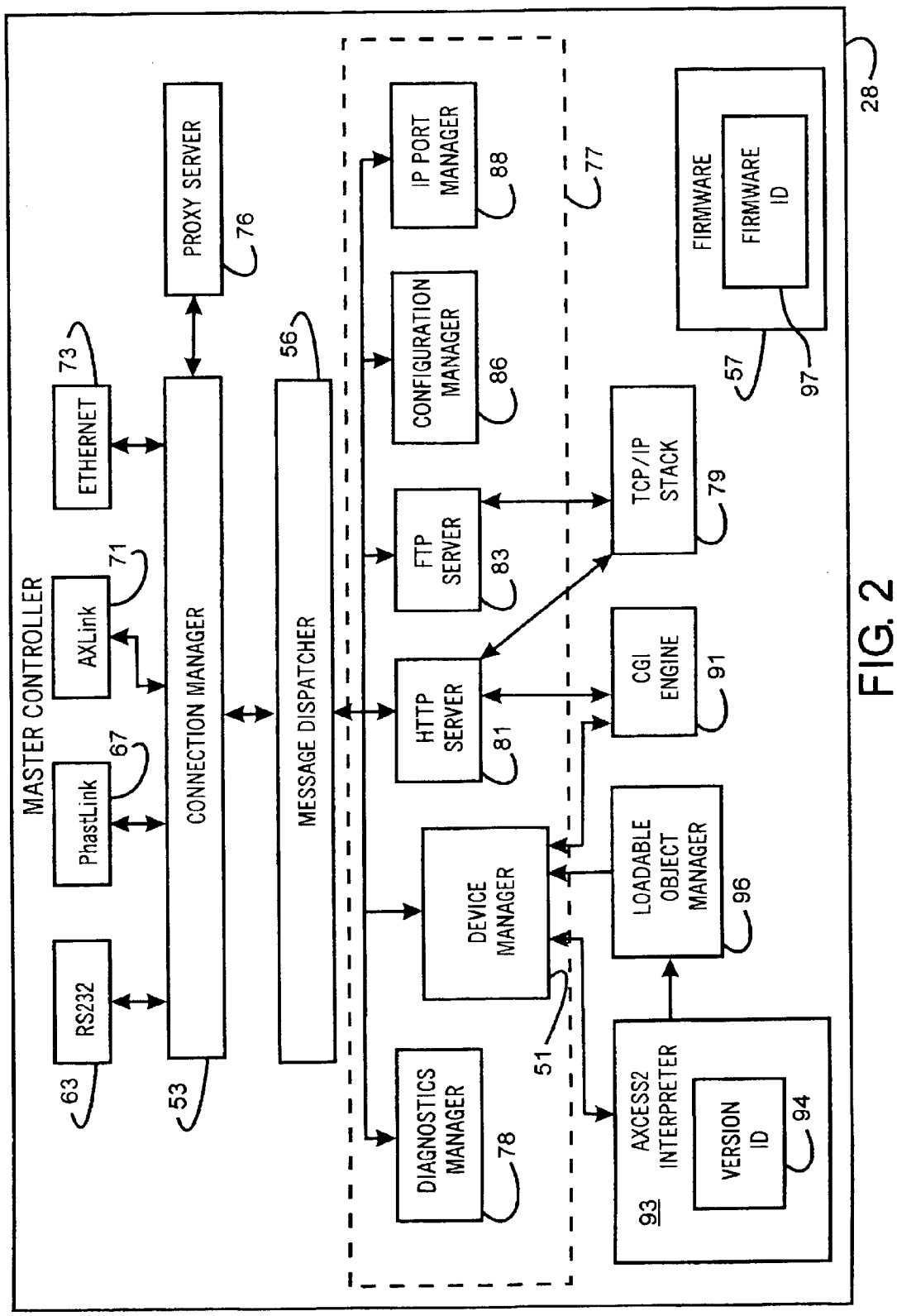
FIG. 2 is a detailed block diagram of a master controller according to an embodiment of the teachings of the present invention.

Each CAN system 21, 23, and 26 includes a master controller 28 (respectively, 28A, 28B and 28C) which are described in more detail in association with FIG. 2. Master controller 28 refer to a generic master controller, while 28A–C refer to specific master controllers. In one embodiment, one master controller defines one CAN system. Stated another way, there exists a one-to-one correspondence between CAN systems and master controllers. Each CAN system 21, 23 and 26 further has associated therewith a system identifier 27.

System identifier 27 is used to uniquely identify each CAN system in a particular control area network. The system identifier may be any value or reference suitable to represent distinct systems, for example, integers, floating point numbers and character strings. In one embodiment, system identifier 27 is a numeric value which may be derived from an identifier associated with the respective master controller 28A–C. A system identifier is unique with respect to a control area network, but may be reused by a different control area network.

In order to provide a clearer understanding of the present invention, an example is provided. Referring to FIG. 1, CAN systems 21, 23 and 26 may respectively control three rooms in a house, specifically a living room, a kitchen and a bedroom. Various associated external devices 34 are controlled using the CAN systems. In particular, referring to the device and system numbers shown in FIG. 1, device 1:1 (hereinafter, a particular device will be referred to as "device A:B" where A is the device number and B is the system number, i.e. device 1:1 is device 1 coupled to master controller 1) controls a security alarm panel and device 2:1 controls a TV, both in the living room. Device 1:2 is a microwave oven and device 2:2 controls a light switch, both in the kitchen. Device 1:3 controls a VCR and device 2:3 controls an alarm clock, both in the bedroom.

A respective hub 31 may be coupled to each master controller 28. In the disclosed embodiment, hub 31 is shown as being separate from master controller 28, however, hub 31 may be integral to master controller 28.

A plurality of devices may be coupled to master controller 28 through hub 31.

In one embodiment, devices 33 are slave devices which require coupling to master controller 28 for proper operation, however, various level of intelligence and capability may be included with devices 33 that may require various levels of control and interaction with master controller 28 for proper operation. Each device 33 has a device number 32 used to uniquely identify each device 33 in a particular CAN system (such as 21, 23 and 26). Device numbers 32 may be any value or reference suitable to represent distinct devices, for example, integers, floating point numbers and character strings. In addition, device numbers 32 are unique within a single CAN system (such as 21, 23 and 26), but may be reused within different CAN systems.

Each device 33 further includes a plurality of ports 35, a plurality of levels (not shown), and a plurality of channels (not shown). Ports 35, levels and channels may be used to communicate with one or more associated external devices 34 controlled by device 33. Devices 33 used to control associated external devices 34 may include infrared emitters, light switches, touch pads, and direct connections to associated external devices 34. For example, associated external devices 34 may include VCRs, TVs, stereo systems, infrared remote controllers, and lights.

Each master controller 28 may be coupled to one or more other master controllers 28 by an intramaster link 36A, 36B and 36C. For example, master controller 28A is coupled to master controller 28B by intramaster link 36A. Intramaster links 36A–C may be Ethernet links, AXLinks links, LONTalk links, Wide Area Network links, Local Area Network links, FTP links, Internet links, fiberoptic links, and other suitable combinations of electrical, physical and logical communication systems. Intramaster links 36A–C may be used to couple one master controller 28A to another master controller or controllers 28B–C that exist in the same or different control area networks (such as 16 and 18) or between different CAN systems (such as 21, 23 and 26). In the disclosed embodiment, intramaster link 36C couples first control area network 16 to second control area network 18 over the Internet 43, while other intramaster links 36A–B couple master controllers 28A–C within a single control area network 16.

Second control area network 18 includes at least one CAN system 38 and a master controller 28D. Second control area network 18 may be configured similarly to first control area network 16 or in any other suitable way and is shown in one embodiment with exemplary master controller 28D. Continuing the previous example, CAN system 38 may represent a security service for home protection. The security service may remotely control the various devices in the home in order to provide increased security when a home owner is out of town. More specifically, a home owner sets the alarm clock in the bedroom to awaken the home owner for a business trip. Master controller 3 (28C) then commands master controller 1 (28A) to activate the TV and set the TV channel to the morning news. After a predetermined delay, such as the amount of time normally spent in the shower by the home owner, master controller 3 (28C) will send a further command to master controller 2 (28B) and request that the lights in the kitchen be turned on so that the homeowner can prepare breakfast. After breakfast the homeowner activates the security alarm using the security alarm panel in the living room and leaves the house. In response to the activation of the security alarm, master controller 1 (28A) turns off the TV using device 1:1 (which master controller 1 (28A) has direct control over) and requests master controller 3 (28C) to turn off the lights in the kitchen with device 2:2. Master controller 1 (28A) then sends a further command to the security service of CAN system 38 informing the security service that the house will be empty for the duration of the business trip. Master controller (28D) of the security service may then send out commands requesting that the various master controllers in the home turn on lights, stereo systems, and TVs to simulate the presence of a person in the house in order to deter crime.

A plurality of content providers 46 may be accessed by master controllers 28A–D over links 36A–C. Content providers 46 may include any of the well-known providers of information on the Internet 43 and, in particular, may also include a company web site which may provide upgrades, enhancements, and other information used to update or modify software or firmware on master controller 28. A web browser 48 may be used to manipulate and control master controllers 28A–D from a remote location over the Internet 43.

FIG. 2 is a block diagram showing details of master controller 28. Each master controller 28 includes a device manager 51, a connection manager 53, a message dispatcher 56, a TCP/IP stack 79 and firmware 57. Each of device manager 51, connection manager 53, message dispatcher 56, and firmware 57 is described only for one exemplary master controller 28, but applies to any particular master controller 28A–D.

Device manager 51 maintains status information about each device 33 coupled to master controller 28. The status information maintained by device manager 51 includes port information, string information, command information, and maintenance information.

The port information includes a port count for each device 33, indicating the number of ports 35 (FIG. 1) supported by each device 33. Each port 35 may include one or more channels and one or more levels. The channels further include input channels and output channels and the levels further include input levels and output levels. Channel information and level information is further respectively maintained for each channel and level of each port on each device 33. The channel information maintains the status of each input channel and each output channel on the port. In the disclosed embodiment, the channel information may include information for 255 input channels and 255 output channels associated with each port 35, but device 33 may specify a different number of channels. Also, each channel may be in either an on or an off state, or may represent a single binary value, for example, high or low, and 0 or 1, respectively. The channels may be used as flags to represent various information about device 33. In the disclosed embodiment, device 33 will inform device manager 51 of the number of channels supported by each port 35 on that device 33 when device 33 is activated, reset or turned on. Device 33 may also inform device manager 51 at a different time or change the number of supported channels dynamically.

The level information maintained by device manager 51 may be used to specify a value within a range of allowed values associated with each port 35, as opposed to the channel information which tracks binary value information. In the disclosed embodiment, device 33 will inform device manager 51 of the number of levels supported by each port 35 on that device 33 when device 33 is activated, reset, or turned on. Device 33 may also inform device manager 51 at a different time or change the number of supported levels dynamically.

The string information maintained by device manager 51 for each device includes a string length and a string data type or types supported by device 33. The string information is used to perform conversions between supported string data types of different devices 33. For example, if a device that utilizes 8-bit character values to represent strings needs to communicate with a device that uses 16-bit character values to represent strings, the string information can be used by device manager 51 to convert between the different string formats of the devices.

Command information maintained by device manager 51 for each device includes a command length and a command data type or types supported by device 33 and may be used to perform conversions between command data types as necessary. For example, if a device that supports only 8-bit data for commands needs to communicate with a device that supports commands using 16-bit data, the command information can be used by device manager 51 to convert between the supported command types so that the devices may communicate.

The maintenance information associated with device 33 may include a device type identifier, a serial number, a firmware ID, and a version string. If necessary, multiple sets of maintenance information may be maintained for a single given device 33. For example, a device 33 with both an onboard network communication chip and an onboard CPU may include two sets of maintenance information, one set for the network chip and one set for the CPU. The device type identifier may include a numeric or alphanumeric value representing the type of device. For example, the device type identifier may identify a particular device 33 as a touch pad, a light switch, or an infrared remote control. The firmware ID may include an identifier representing the current firmware version and compatible updates.

Device manager 51 on each master controller 28 may also maintain non-local device information for devices 33 which are not part of the corresponding CAN system of particular master controller 28A–D. Non-local devices 33 are devices 33 which are not coupled to same master controller 28 as local devices 33. The non-local device information may also include the port information, channel information, level information, string information and command information similar to that maintained for local devices 33, and additionally includes notification information for non-local devices 33. The notification information includes the status of requests for events from other systems. The notification information allows devices 33 to request and receive data and event information from non-local devices 33.

Connection manager 53 operates to manage various physical interfaces, which may include an RS232 interface 63, a PhastLink interface 67, as AXLink interface 71, and an Ethernet interface 73. Connection manager 53 receives information from various interfaces 63, 67, 71 and 73 and dispatches the data, with appropriate formatting applied if necessary, to message dispatcher 56. Connection manager 53 further provides whatever application-level management various interfaces 63, 67, 71 and 73 require. Interfaces 63, 67, 71, and 73 may be used to physically and electrically couple devices 33 to master controller 28. Interfaces 63, 67, 71 and 73 may also be used to communicate with intramaster links 36 to connect one master controller 28 to another master controller 28. Interfaces 63, 67, 71 and 73 may also be used to couple master controllers 28A–D to the Internet 43. In one embodiment, the Internet 43 is coupled to master controller 28B through Ethernet interface 73 on master controller 28B.

Connection manager 53 may also manage communication with a proxy server 76. Proxy server 76 provides an alternate method for master controller 28B to communicate with the Internet 43. Proxy server 76 provides master controller 28B with greater security against intrusion and tampering from external, unauthorized users connected to the Internet 43 while providing Internet communications functionality to master controller 28B.

Message dispatcher 56 is coupled to connection manager 53 and receives data from connection manager 53. Message dispatcher 56 is further coupled to a plurality of modules 77 which include a diagnostics manager 78, device manager 51, a configuration manager 86, and an IP port manager 88. In one embodiment, modules 77 may also include an FTP server 83 and an HTTP server 81 which may not be coupled to message dispatcher 56.

Message dispatcher 56 operates to route data received from connection manager 53 and other modules 77 to appropriate modules 77. Message dispatcher 56 dispatches the data from connection manager 53 and other modules 77, such as diagnostics manager 78, configuration 86, and IP port manager 88, based on the content of the data, the dispatching information from connection manager 53 and modules 77, and other suitable criteria.

Diagnostics manager 78 operates to monitor the operational status of devices 33. Diagnostics manager 78 may examine specific diagnostic data generated by devices 33 in response to diagnostic commands sent to devices 33 and may also examine error messages independently generated by devices 33 and modules 77.

TCP/IP stack 79 is coupled to the HTTP server 81 and the FTP server 83, and provides TCP/IP based protocol and communication services to master controller 28, HTTP server 81 and FTP server 83.

HTTP server 81 provides Hypertext Transport Protocol (HTTP) services to master controller 28. HTTP server 81 may be used to receive and respond to commands generated by a user at a remote location, such as a user using web browser 48 (FIG. 1) to control first or second control area networks 16 and 18. HTTP server 81 processes the commands through a CGI engine 91. CGI engine 91 operates to interpret CGI scripts which define behavior and handling instructions for commands received over the Internet 43 by HTTP server 81. CGI engine 91 provides services which may include security and remote control services appropriate to the control area network (such as 16 and 18), master controllers 28A–D and devices 33. CGI engine 91 is further coupled to device manager 51 and manipulates devices 33 through device manager 51.

FTP server 83 provides file transfer protocol (FTP) services to master controller 28. In particular, FTP server 83 may be used to provide FTP-based communications to remote users who communicate with master controller 28 over the Internet 43. FTP server 83 may be used to provide, for example, remote updating of the software and firmware controlling master controller 28. A configuration manager 86 operates to configure and reconfigure master controller 28 in suitable ways. IP port manager 88 provides suitable management capabilities for the various Internet protocol (IP) functionalities on master controller 28.

Device manager 51 is further coupled to an interpreter 93 and a loadable object manager 96. Interpreter includes a version identifier 94. The version identifier 94 may include an identifier representing the current interpreter version and compatible upgrades. Interpreter 93 provides run-time interpretation of the software used to run master controllers 28 and to control devices 33. Interpreter 93 communicates with loadable object manager 96 to dynamically add new functionality to master controllers 28, modules 77 and interpreter 93.

Given the rapid rate of change and development in the computer and software industries, new updates, patches, and upgrades often become available during the lifetime of a product. These updates, patches and upgrades provide new and enhanced functionality, as well as fixing errors in previous versions of the software and hardware associated with the product. Master controller 28 may be updated in the following manner. In one embodiment, loadable object manager 96 may be used in conjunction with FTP server 83 to retrieve software and firmware updates, patches and upgrades from one of the content providers 46 over the Internet 43 and then dynamically add the new functionality provided by the patches, updates and upgrades to device manager 51, interpreter 93 and other software and firmware associated with master controller 28. The new functionality may be added using loadable object manager 96. First, communication is established by a user with one or more of the content providers 46 via FTP server 83. The user may be using web browser 48 or devices 33 to communicate with content providers 46. A list of available files is then presented to the user. The user selects one or more of the available files to be used to update master controller 28. Alternatively, appropriate files may be selected automatically for the user by master controller 28 as a function of firmware identifier 97 and version identifier 94. Other criteria may be used by the user and master controller 28 in selecting files, such as other version and identification information that may be associated with other elements of master controller 28. For example, device manager 51 and connection manager 53 may include version identifiers which could be used in selecting the appropriate files. The selected files may be used to update both software and firmware, either individually or in combination, on master controller 28. For example, firmware 57 could be updated, as well as software such as device manager 51, interpreter 93, and connection manager 53. Other elements of master controller 28 could also be updated.

Firmware 57 provides required suitable functionality at a hardware level to master controller 28. In the disclosed embodiment, firmware 57 controls the operations and interactions of interfaces 63, 67, 71 and 73. The firmware 57 may also control the operation of various other hardware which forms portions of master controller 28. Firmware 57 includes a firmware identifier 97. Firmware identifier 97 may provide identification and version information relating to firmware 57. Firmware identifier 97 may also serve to identify compatible upgrades, updates and patches that may be applied to firmware 57. Firmware identifier 97, in one embodiment, is an alphanumeric value, but may include any suitable representation.

Figure 3:
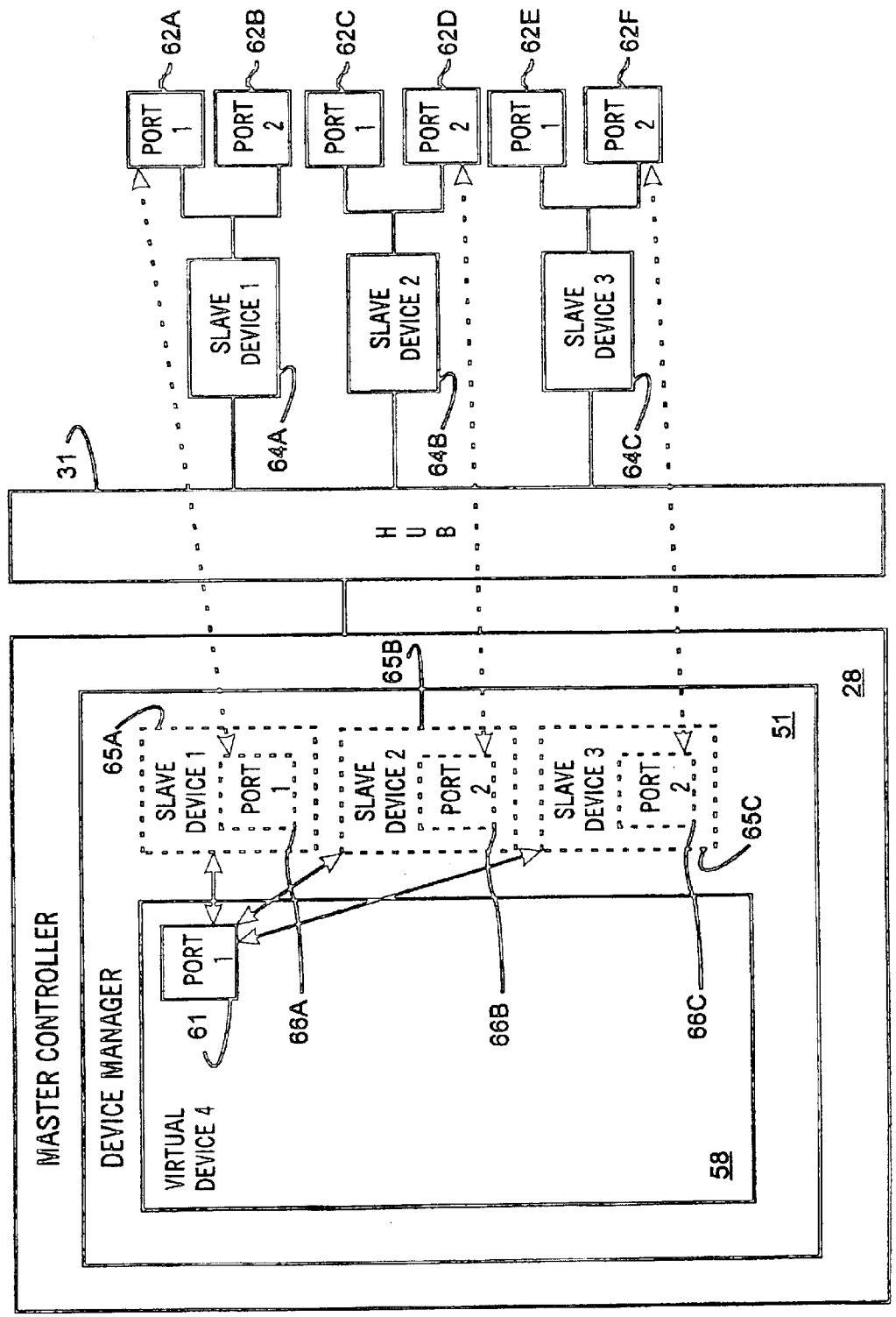
FIG. 3 is a detailed block diagram of a virtual device according to an embodiment of the teachings of the present invention.

Device manager 51 is further operable to provide a plurality of virtual elements corresponding to physical elements associated with master controllers 28, such as devices 33, ports 35, levels, channels, strings, commands, and notifications. Virtual elements may include a plurality of input elements coupled to output elements of each linked physical element, and a plurality of output elements coupled to input elements of each linked physical element. FIG. 3 is a detailed block diagram of a particular virtual element, a virtual device 58. Virtual device 58 is a logical construct in device manager 51 which may be used to unify or group the behavior of a plurality of physical elements. For example, the virtual device 58 may be created by issuing the command DEFINE_COMBINE(VirtualDevice, PhysicalDevice, PhysicalDevice) to the device manager 51. Virtual device 58 includes a plurality of input elements coupled to output elements of each linked physical element, and a plurality of output elements coupled to input elements of each linked physical element.

Virtual device 58 may include a virtual port 61. Virtual port 61 operates to link a plurality of ports 62A, 62B, 62C, 62D, 62E, and 62F having associated levels, channels, strings and commands on a group of devices 64A, 64B and 64C with virtual levels, virtual channels, virtual strings and virtual commands associated with virtual port 61. The virtual device 58, using the virtual port 61, maintains a logical device representation 65A, 65B and 65C (shown by dashed lines in FIG. 3) of respective physical devices 64A–C and a logical port representation 66A, 66B and 66C of respective physical ports 62A, 62D, and 62F. For example, virtual port 61 is represented by device manager 51 as the first port (port 1) of device number 4 which is known to device manager 51 as one of virtual devices 58. Virtual port 61 links port 1 (62A) of device 1, port 2 (62D) of device 2, and port 2 (62F) of device 3. Commands or information sent to device 4, port 1 (61) are replicated by device manager 51 and individually sent to the linked devices, specifically device 1, port 1 (62A), device 2, port 2 (62D), and device 3, port 2 (62F). Similarly, the nature of the links between virtual device 4 and the physical elements allows a change in the level of port 2 (62D) of device 2 to be detected by device manager 51 and handled as a change in the virtual level of virtual device 4, port 1 (61). The detected change in the level at device 2, port 2 (62D) is replicated at the respective levels of device 1, port 1 (62A), and device 3, port 2 (62F) by device manager 51 and is reported out to master controller 28 as a change in virtual device 4 (58).

Also, the nature of the links between virtual device 4 and the physical elements confines a change in the channels, commands and strings of port 2. (62D) of device 2 to be detected by device manager 51 and handled as a change in the respective virtual channels, virtual commands and virtual strings of virtual device 4, port 1 (61). In contrast to changes in the levels, the detected change in the channels, strings and commands of device 2, port 2 (62D) is not replicated at the respective channels, strings and commands of device 1, port 1 (62A), and device 3, port 2 (62F) by device manager 51. Stated another way, the output elements of the virtual device 58 (from the virtual device 58 to the physical devices 33) are maintained in a substantially similar or identical condition, while the input elements (from the physical device 33 to the virtual device 58) are not required to be in a substantially similar or identical state.

Each physical element and virtual element may have a state (not shown) associated therewith, where the state represents various data values associated with the corresponding element. A portion of the state represents the levels associated with the corresponding element, and a further portion of the state represents the channels, strings and commands associated with the corresponding element. Virtual elements provide a logical link between the state of the virtual element and the corresponding physical element. The behavior of the physical elements may be maintained and updated so that the portion of the states representing the respective physical and virtual elements' levels are identical or substantially similar to each other. The portion of the state associated with the virtual element level may also be maintained and updated similarly to the portion of the state associated with the physical elements' levels, such that the portion of the virtual element's state associated with the virtual element's levels is identical or substantially similar to the portion of the state of the respective physical element associated with the physical element's levels. The linking between the virtual element levels and the physical element levels is achieved by replicating commands and propagating state changes found at the virtual element levels to the physical element levels, and further by replicating commands and propagating state changes from any one of the linked physical elements to the corresponding virtual element and then to the other linked physical elements.

In contrast, the behavior of the channels, strings and commands of the physical elements are maintained and updated such that changes in the further portion of the state of the virtual element are propagated to the further portion of the states of the respective physical elements, while changes in the further portions of the states in the physical elements are propagated only to the virtual element. In other words, changes in the channels, strings and commands of the virtual element are propagated to all of the linked physical elements, but changes in the linked physical elements are only propagated to the virtual element.

For example, a change in the state associated with virtual port 61 will be replicated and propagated through logical port representation 66A–66C to physical ports 62A, 62D, and 62F. Similarly, a change in the state associated with the level of physical port 62A will be propagated to virtual port 61 and then replicated by virtual port 61 and propagated to physical ports 62A and 62F through logical port representations 66A and 66C, respectively. In contrast, a change in the state associated with the channels, strings and commands of physical port 62A will be propagated only to virtual port 61.

The virtual elements are treated similarly to their respective physical elements by master controller 28. The linking between virtual elements and physical elements, in one embodiment, may be performed at compile time and may be changed by rewriting and restarting the program code used to control master controller 28. In another embodiment, the linking between virtual elements and physical elements may be dynamically changed at run time without having to reload the underlying program code for master controller 28, for example, by changing the value of a variable in the underlying program code and by issuing the command UNCOMBINE_CHANNELS(VirtualDevice) to the device manager 51. Virtual elements are treated in the same manner by master controller 28 as the physical elements and the virtual nature of virtual elements is known only to device manager 51.

Figure 4:
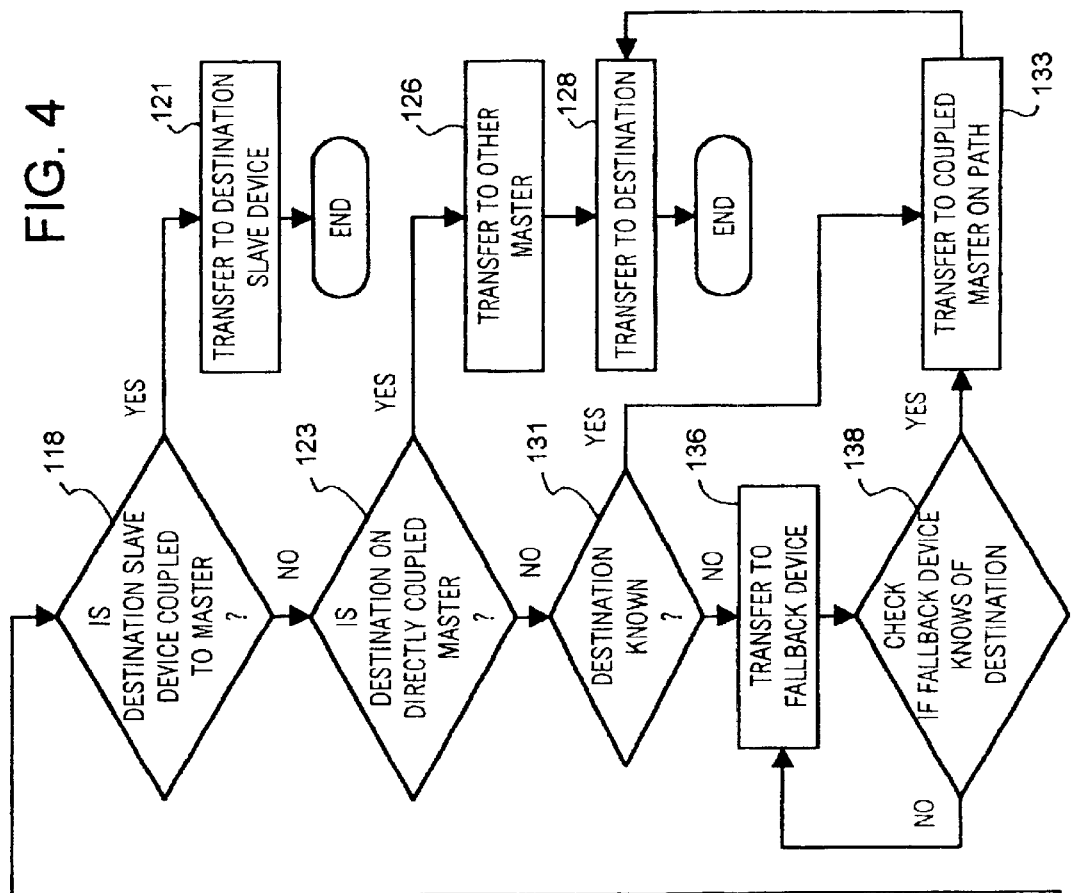
FIG. 4 is a flow chart showing a method for routing data between a plurality of the master controllers according to an embodiment of the teachings of the present invention.

FIG. 4 is a flow chart showing a method for routing data between master controllers 28. The method begins at step 98 with the activation of master controller 28. As part of device activation step 98, master controller 28 may perform whatever initialization and startup preparation suitable for master controller 28.

For convenience, the master controller just activated in step 98 will be referred to as the "activated master controller" for example, master controller 28A. One or more master controllers 28 directly connected to the activated master controller will be referred to as "connected master controllers", for example, master controller 28B, and all further master controllers 28 which may communicate with the activated master controller will be referred to as "other master controllers", for example, master controllers 28C and 28D.

Next, the method proceeds to step 101 where the activated master controller transmits a connections table request to all interfaces on the activated master controller. The connections table request is a request by the activated master controller for all information that the connected master controllers have regarding the other master controllers and for information regarding the connected master controllers themselves. Specifically, the activated master controller is requesting information regarding one or more paths that may exist between the activated master controller, and the connected and other master controllers. Each path is a sequence of master controllers that must be traversed to get from one master controller to another, for example, the activated master controller would have paths from the activated master controller to connected and other master controllers. The activated master controller will use this information to route data from devices 33 coupled to the activated master controller to destinations. These paths are represented by a connections table. The connections table, in order to represent each path, stores the master controller or master controllers through which data must pass to reach a particular master controller. For example, referring to FIG. 1, master controller 28A is coupled to master controller 28B, and master controller 28B is coupled to master controller 28C, thus, master controller 28A will store in the connections table a path from 28A to 28B and a path from 28A to 28C through 28B.

Proceeding to step 103, the activated master controller 28A receives one or more connections tables from one or more of the connected 28B and other master controllers 28C–D. Then, at step 106, the activated master controller 28A updates an internal connections table using the one or more connections tables received from the connected 28B and other master controllers 28C–D.

An example of steps 98–106 is presented in order to further clarify those steps. Referring to FIG. 1, when master controller 28A activates (step 98), it transmits a connections table request (step 101) to master controller 28B. Master controller 28B then sends connections tables representing the path from master controller 28A to master controller 28B, and the path from master controller 28A to master controller 28C through master controller 28B. Master controller 28B would also include in the connections table the path from master controller 28A to master controller 28D through master controller 28B and the Internet 43. After master controller 28A has received the connections tables from master controller 28B (step 103), master controller 28A updates its internal connections table so that if one of devices 33 coupled to master controller 28A needs to communicate with one of devices 33 coupled to master controller 28B–D, master controller 28A will know if the destination device is reachable from master controller 28A and if the destination device is reachable, which path the data should be routed over. The internal connections table may also include a fallback device. The fallback device is a master controller that master controller 28A will send data to if the destination device is unreachable. Thus, the fallback device comes into use when the master controller does not know how to contact the destination device. The goal of the fallback device is that the fallback device will know how to contact the destination device even if the master controller using the fallback device did not.

The method continues at step 108 where one of devices 33 coupled to activated master controller (28A) generates data that is bound for another device 33 (the destination device). Next, at step 111, activated master controller (28A) receives the data. Proceeding to step 113, the activated master controller (28A) inspects the data received from device 33. Inspection step 113 is used to determine which device is the destination device. In particular, the particular system will be determined and the particular device within the system. For example, by consulting system number 27 and an identifier associated with the device 33.

Next, at step 116, the location of the destination slave device is determined. The destination slave device will be in one of three locations: 1) the destination device will be coupled to activated master controller (28A); 2) the destination slave device will be coupled to one of the connected master controllers (28B); or 3) the destination slave device will be coupled to one of the other master controllers (28C–D).

Then, at decisional step 118, if the destination device is coupled to activated master controller (28A), then the YES branch of decisional step 118 is followed. The YES branch of decisional step 118 leads to step 121 which transfers the data to the destination device and the method ends. If the destination device is not coupled to activated master controller (28A), then the NO branch of decisional step 118 is followed to decisional step 123.

At decisional step 123, if the destination device is coupled to one of the connected master controllers (28B), then the YES branch of decisional step 123 is followed and the method proceeds to step 126. At step 126, the activated master controller transfers the data to the connected master controller (28B) having the destination device coupled thereto. Then the method would proceed from step 126 to step 128 where the connected master controller (28B) having the destination device coupled thereto would transfer the data to the destination device and the method would end. If the destination device is not coupled to one of the connected master controllers (28B) then the NO branch of decisional step 123 is followed to decisional step 131.

Proceeding to decisional step 131, if the destination device is coupled to one of the other master controllers (28C–D), then the YES branch of decisional step 131 is followed and the method proceeds to step 133. If the destination slave device is not coupled to one of the other master controllers (28C–D), then the NO branch of decisional step 131 is followed to step 136.

If the YES branch of decisional step 131 is followed, the method proceeds to step 133. In step 133, the data is transferred from master controller to master controller until the master controller having the destination device coupled thereto is reached. The data is first transferred from the activated master controller (28A) to the connected master controller (28B) which is the first master controller on the path to the master controller having the destination device coupled thereto. The connected master controller which receives the data then passes the data on to the next master controller on the path to the master controller having the destination device coupled thereto. The data continues to be passed on to further master controllers until the master controller having the destination device coupled thereto is reached.

If the NO branch of decisional step 131 is followed, the method proceeds to step 136 where the data is transferred to the fallback device. As described above, the fallback device represents a master controller that the activated master controller will transfer information to if the destination device is coupled to a master controller not known to the activated master controller (28A). Stated another way, if the activated master controller (28A) has no path in its internal connections table to the master controller having the destination device coupled thereto, the activated master controller (28A) will transmit the data to the fallback master controller in the hope that the fallback master controller will know of a path to the master controller having the destination device coupled thereto.

Proceeding to decisional step 138, after the data has been transferred to the fallback device in step 136 the fallback master controller determines if it knows of the master controller having the destination slave device coupled thereto. If the fallback master device knows of the master controller having the destination slave device coupled thereto, the YES branch of decisional step 138 is followed and the method proceeds to step 133 to transfer the data as described above. If the fallback master does not know of the master controller having a destination slave device coupled thereto, the NO branch of decisional step 138 is followed and the fallback master will transfer the data to its fallback master controller in the hope that its fallback master controller will know of the master controller having the destination slave device coupled thereto. Once the fallback master controller receives the data, the fallback master will operate in a manner similar to the activated master controller (28A) to attempt to find the master controller having the destination device coupled thereto.

The data further includes a transfer count that tracks the number of master controllers the data has been transferred to. If the transfer count exceeds a predetermined point then the destination device is considered to be completely unreachable, the data is discarded and an error message is generated.

Figure 5:
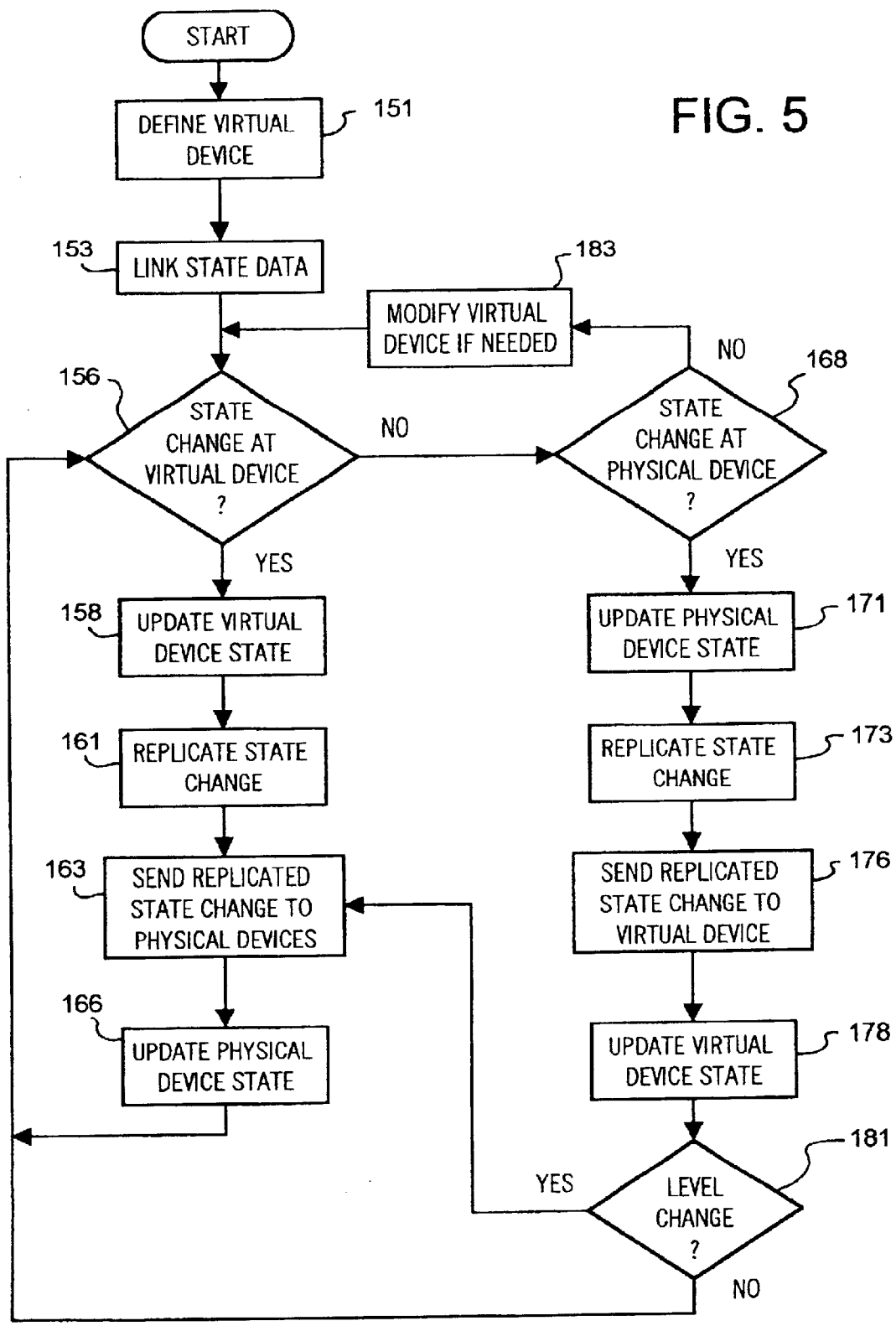
FIG. 5 is a flowchart showing a method for operating virtual elements by a master controller in a control area network according to an embodiment of the teachings of the present invention.

FIG. 5 is a flowchart showing a method for operating virtual elements by a master controller 28 in a control area network (16 and 18) according to an embodiment of the teachings of the present invention. The method begins at step 151 where the virtual element is defined. As noted previously in association with FIG. 3, the virtual element is a logical construct used to group physical elements such as devices 33, ports 35, levels, channels, strings, commands, and notifications. The virtual element is defined by linking at least two physical elements with one virtual element. Multiple virtual elements may share particular physical elements and multiple physical elements may share particular virtual elements. In one embodiment, the virtual element is virtual device 58 and the physical elements are devices 33 (referred to as "physical devices 33" in the context of FIG. 5 in order to clearly differentiate virtual and physical devices).

Next, the method proceeds to step 153 where a virtual device state associated with the virtual device 58 is linked with physical device states respectively associated with physical devices 33, which are linked to virtual device 58. Generally, virtual elements will have an associated state and physical elements will also have an associated state. The virtual device state represents data values associated with the virtual device, and the physical device state represents a plurality of data values associated with the physical device. The virtual device state and the respective physical device states are linked such that the virtual and physical device states may be maintained in a substantially similar condition. The linked virtual and physical device states may also be maintained in an identical condition.

The method proceeds to decisional step 156 where a check is made for a request to change the virtual device state. The virtual device state may change in response to a data state change request received at the virtual device 58 or to other suitable criteria. If no request to change the virtual device state is detected, then the NO branch of decisional step 156 is followed to decisional step 168. If a request to change the virtual device state is detected, then the YES branch of decisional step 156 is followed to step 158.

From the YES branch of decisional step 156 the method proceeds to step 158, where the method updates the virtual device state in response to the request to the change the virtual device state. Then, at step 161, the method replicates the change in the virtual device state. In one embodiment of the present invention, the change in the virtual device state is replicated by generating a data state change request for each respective physical device 33 linked to the virtual device 58. Each generated data state change request is tailored to induce a change in the corresponding physical device state which is substantially similar to the change induced in the virtual device state. The induced change in the physical device may also be identical to the change in the virtual device.

Next, at step 163, the method sends the generated data state change requests to respective devices and, at step 166, the respective physical device states are updated in response to the corresponding generated data state change requests.

Returning to the NO branch of decisional step 156, the method proceeds to decisional step 168 where a check is performed for a request to change one or more of the respective physical device states. If no request to change one more of the physical device states is detected, then the NO branch of decisional step 168 is followed to step 183. If a request to change one or more of the physical device states is detected, then the YES branch of decisional step 168 is followed to step 171 where the method updates the respective physical device states. Then, at step 173, the change in the respective physical device state is replicated and, at step 176, sent to the virtual device 58. In one embodiment of the present invention, a data state change request is received at one or more of the respective physical devices 33 and a copy of the received data state change request is sent to the virtual device 58. Proceeding to step 178, the method updates the virtual device state in response to the copy of the data state change request from step 173.

Next, at decisional step 181, the method determines if the data state change request effected a change in the state of the levels respectively associated with the physical devices 33. If a state change is not detected in the levels, but rather in the channels, strings and commands, then the NO branch of decisional step 181 is followed and the method proceeds back to step 156.

If a state change is detected in the levels then the method replicates the state change induced in the virtual device state by copy of the data state change request from step 173 by generating at least one data state change request for each physical device 33 linked to the virtual device 58 except for the physical device 33 that has already updated its corresponding physical device state in step 171. Stated another way, virtual elements link or unify the behavior of physical elements such that a change in the virtual element state is reflected in the respective physical element states associated with linked physical elements, and a change in one or more physical element states is reflected in the virtual element state and the other respective physical element states. Thus, in step 181, the method is reacting to a change in one or more physical device states that must be propagated or replicated at the virtual device 58 and also at the other linked physical devices 33. Therefore, no generated state change request need be generated, for the physical device 33 that is inducing the state change in the virtual device state and the other linked physical device states since the excluded device's state was already updated at step 171. The method then follows the YES branch of decisional step 181 back to step 163 where the generated state change requests generated in step 181 are sent to corresponding physical devices 33.

Returning to the NO branch of decisional step 168, the method proceeds to step 183 where the method performs any modifications to the virtual elements indicated by input from the user, master controller 28 or other suitable input, to change one or more virtual elements. Modifications to the virtual elements may include linking additional physical elements to a particular virtual element or elements, removing physical elements from a particular virtual element or elements, creating a entirely new virtual element, and deleting an entire virtual element. In one embodiment, modification step 183 is performed using virtual device 58 and physical devices 33. The method then returns to step 156 and continues to maintain linked virtual and physical element states until the method is commanded to end (not shown).

Figure 6:
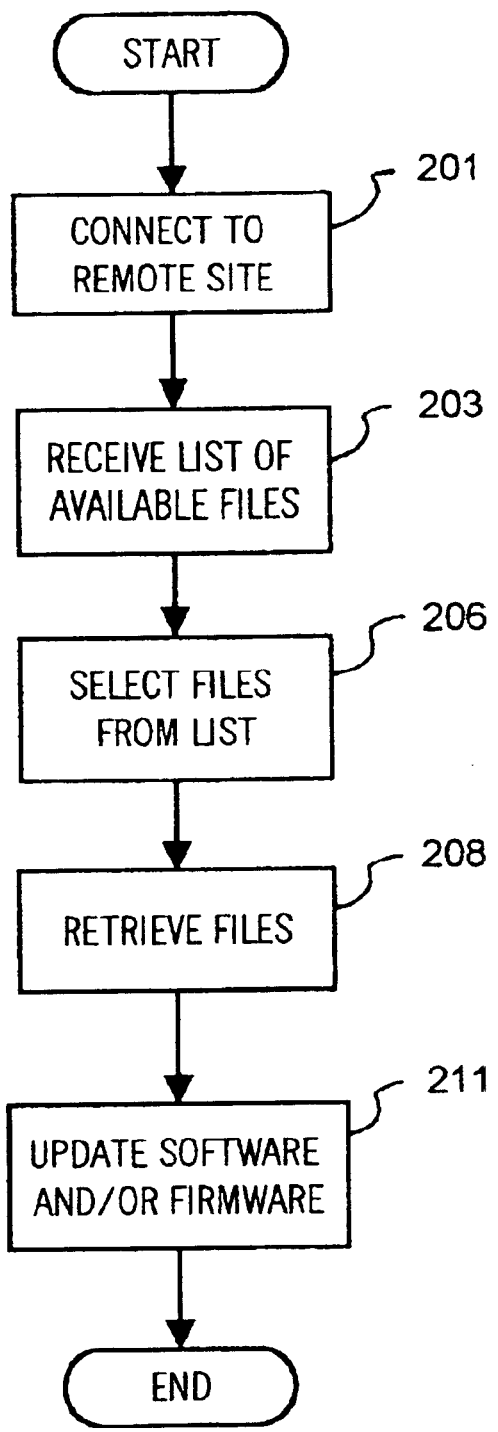
FIG. 6 is a flowchart showing a method for dynamically updating a master controller in a control area network according to an embodiment of the teachings of the present invention.

FIG. 6 is a flowchart showing a method for dynamically updating master controllers 28 in a control area network (16 and 18) according to an embodiment of the teachings of the present invention. The method begins at step 201 where master controller 28 connects to a remote site. In one embodiment of the present invention, the remote site is one or more of content providers 46 and the connection to content providers 46 is created over the Internet 43 using FTP server 83 (shown in FIG. 1). The connection with the remote site may be initiated automatically by master controller 28, in response to user input or in response to any suitable criteria. For example, based on version identifiers associated with software or firmware, the master controller 28 could actively search out updates, upgrades and patches.

Next, at step 203, the method receives or retrieves a list of files available from the remote site. Then, at step 206, the method selects at least one of the files in the list. The selection may be performed manually by the user, automatically by master controller 28 and by a combination of manual input and automatic selection. In particular, the selection may be based on one or more version identifiers and firmware identifier 97 (shown in FIG. 2), but any other suitable criteria may be used.

Version identifiers be used to identify version, age, compatibility and other information associated with software on master controller 28. Software may include content provider interfaces to provide communication services with various content providers, other user or retailer added software, or other suitable software. For example, a security and home protection service may load custom software onto master controller 28. The software elements may have respective associated identifiers that may be used by the present method or the various software elements may share identifiers.

Firmware identifier 97 may be used to determine the version, age, compatibility and other criteria associated with firmware 57 on master controller 28. The firmware 57 may also include firmware associated with the interfaces 63, 67, 71 and 73, interpreter 93, any modules 77, message dispatcher 56, CGI engine 91, proxy server 76 and connection manager 53, as well as any other suitable part of master controller 28 which is implemented in firmware. In addition, the various pieces of firmware may have individual identifiers associated with them as well as being able to share firmware identifier 97.

Version identifiers and firmware identifier 97 may be used alone or in combination with each other to determine which files in the list are compatible with the software and firmware 57 on master controller 28, as well as whether the files in the list are older or newer than the software and firmware 57 on master controller 28.

Then, at step 208, the files selected in step 206 are retrieved from the remote site. Proceeding to step 211, the software and the firmware may be updated either individually or collectively.

The software may be updated while the software is in use. Stated another way, master controller 28 does not need to be reset or interrupted in any substantial way in order to update the software using the files selected for updating the software. The firmware may also be updated without resetting or interrupting master controller 28. In one embodiment, the loadable object manager 96 (shown in FIG. 2) is used to update the software and firmware 57 on master controller 28.

Based on the selected files, master controller 28 or the user may determine that only one of the software and firmware 57 need to be updated. If the method determines that only the software needs to be updated then only the software will be updated, similarly, if the method determines that only the firmware needs to be updated then only the firmware will be updated. The software and firmware 57 may also be updated collectively, for example, by simultaneously updating both.

Once the software and/or firmware have been updated, the method ends until invoked again either automatically by master controller 28, in response to user input or in response to other suitable criteria.

The present invention provides a number of technical advantages. One such technical advantage is the ability to allow multiple master controllers to communicate and route data thereamong. Another such technical advantage is the ability to allow multiple master controllers in separate control area networks to communicate and route data thereamong. A further technical advantage is the ability to utilize the Internet for communication between master controllers and to allow a user to control master controllers using a web browser over the Internet. Yet another technical advantage is the ability to support distributed and interconnected control area networks and control area network systems which allows logical and geographic partitioning of devices.

It should be recognized that direct connections disclosed herein could be altered, such that two disclosed components or elements would be coupled to one another through an intermediate device or devices without being directly connected, while still realizing the present invention. Other changes, substitutions and alterations are also possible without departing from the spirit and scope of the present invention, as defined by the following claims.

What is claimed is:

1. A control network comprising;
   a communications network;
   a first master controller and a second master controller, said first and second master controllers being coupled to said communications network;
   a plurality of devices, a first set of devices being coupled to said first master controller and a second set of devices being coupled to said second master controller via said communications network, each device having at least one port;
   a first device manager associated with said first master controller and a second device manager associated with said second master controller, said first device manager maintaining first device status data associated with said first set of devices, said second device manager maintaining second device status data associated with said second set of devices, and said first and second device status data including the number of ports on respective devices in said respective sets and a status of each said port, the number and a status of a plurality of levels associated with each said port, and the number and status of a plurality of channels associated with each said port; and
   a first connection manager associated with said first master controller and a second connection manager associated with said second master controller, said first connection manager being operable to accept data from said first set of devices and route said data to said second master controller, said second connection manager being operable to accept said data from said first master controller and send said data to said second set of devices.

2. The control network according to claim 1, wherein said second connection manager is operable to accept data from said second set of devices and route said data to said first master controller, said first connection manager being operable to accept said data from said second master controller and send said data to said first set of devices.

3. The control network according to claim 1,
   wherein said first connection manager includes a first connections table and said second connection manager includes a second connections table.

4. The control network according to claim 3, wherein an external device communicates with said port.

5. The control network according to claim 4, wherein said port controls said external device.

6. The control network according to claim 1, wherein said device is a slave device controlled by said master controller.

7. The control network according to claim 3, wherein said first connections table includes a plurality of entries, each said entry representing a path from said first master controller to a remote master controller distinct from said first master controller.

8. The control network according to claim 7, wherein said path is a sequence of at least two master controllers that is traversed to get from said first master controller to said remote master controller.

9. The control network according to claim 8, wherein the sequence further includes a cost associated with each element in the sequence.

10. The control network according to claim 8, wherein said remote master controller is said second master controller.

11. The control network according to claim 8, wherein said remote master controller is distinct from said second master controller.

12. The control network according to claim 8, wherein the sequence is ordered.

13. The control network according to claim 7, further including a fallback master controller coupled to said first master controller and wherein said first connections table further includes a fallback entry, said fallback entry representing said fallback master controller, and wherein said fallback entry is used by said first master controller to route data when said entries in said first connections table lack said second master controller.

14. The control network according to claim 3, wherein said second connections table includes a plurality of entries, each said entry representing a path from said second master controller to a remote master controller distinct from said second master controller.

15. The control network according to claim 14, wherein said path is a sequence of master controllers that is traversed to get from said second master controller to said remote master controller.

16. The control network according to claim 15, wherein said remote master controller is said first master controller.

17. The control network according to claim 14, wherein said remote master controller is distinct from said first master controller.

18. The control network according to claim 14, further including a fallback master controller coupled to said second master controller and wherein said second connections table further includes a fallback entry, said fallback entry representing said fallback master controller, and wherein said fallback entry is used by said second master controller to route data when said entries in said second connections table lack said first master controller.

19. A method for routing data in a control network including a plurality of master controllers, a first master controller having a first set of devices coupled thereto, and a second master controller having a second set of devices coupled thereto, the second master controller directly coupled to the first master controller, and the method comprising:

maintaining routing information, including maintaining a connections table associated with the first master controller, the connections table including a plurality of table entries wherein each entry represents a path from the first master controller to a remote master controller, the connections table further including a fallback entry representing another master controller, distinct from the first master controller, to which data will be routed when a destination device is unknown to the first master controller;

generating data at a first selected one of the first set of devices;

transmitting the data from the first selected device to the first master controller;

receiving the data at the first master controller;

inspecting the data at the first master controller to determine a destination device for the data;

determining which of the first and second set of devices includes the destination device;

sending the data to the second master controller, upon determining that the destination device is in the second set;

receiving the data at the second master controller to determine which device in the second set is the destination device; and sending the data to the destination device.

20. The method according to claim 19, wherein inspecting the data further includes determining the destination based on a system identifier and a device identifier in the data.

21. The method according to claim 19, wherein routing the data to the destination device includes sending the data to the destination device in the first set of devices.

22. The method according to claim 19, wherein the connections table further includes a fallback entry used by the first master controller to route data when the destination device of the data is unrepresented in the entries of the connections table.

23. The method according to claim 19, wherein the path includes a sequence of at least two master controllers that is traversed to get from the first master controller to the remote master controller.

24. The method according to claim 19, wherein the destination device is in the second set, wherein the second master controller is coupled to the first master controller through at least one further master controller distinct from the first and second master controllers and wherein routing the data to the destination device includes:

selecting one entry from the connections table which has the second master controller as the remote master controller;

sending the data to the second controller over the selected path;

receiving the data at the second master controller from one of the further master controllers along the selected path;

inspecting the data at the second master controller to determine which device in the second plurality is the destination device; and sending the data to the destination device.

25. The method according to claim 24, wherein sending the data to the second controller over the selected path includes:

sending the data along the selected path to the further master controller which is directly coupled to the first master controller;

determining whether the further master controller is directly coupled to the second master controller; and sending the data based on said determining whether the further master controller is directly coupled to the second master controller step.

26. The method according to claim 25, wherein sending the data based on said determining whether the further master controller is directly coupled to the second master controller step includes:

sending the data to the second master controller when the second master controller is directly coupled to the further master controller and otherwise sending the data to the further master controller which is the next further master controller along the path; and repeating said sending the data to the second master controller when the second master controller is directly coupled to the further master controller and otherwise sending the data to the further master controller which is the next further master controller along the path step until the data is sent to the second master controller.

27. The method according to claim 19, wherein said maintaining the routing data step includes maintaining a connections table associated with the second master controller and wherein the connections table includes a plurality of entries, each entry representing a path from the second master controller to a remote master controller distinct from the second master controller.

28. The method according to claim 27, wherein the connections table further includes a fallback entry used by the first master controller to route data when the destination device of the data is unrepresented in the entries of the connections table.

* * * * *